United States Patent Office
3,630,965
Patented Dec. 28, 1971

1

3,630,965
HYDROCARBON CONVERSION CATALYST
Alexis Voorhies, Jr., Baton Rouge, and Charles N. Kimberlin, Jr., East Baton Rouge, La., assignors to Esso Research and Engineering Company
No Drawing. Filed Mar. 11, 1969, Ser. No. 806,272
Int. Cl. B01j 11/78
U.S. Cl. 252—442                                   16 Claims

ABSTRACT OF THE DISCLOSURE

Improved hydrocarbon catalysts are prepared by treating certain zeolites with hydrogen fluoride. It is preferred that the hydrogen fluoride treatment be accomplished after those preparation steps requiring contact of the zeolite with water at high temperatures. It is also preferred that the zeolite which is subjected to the HF treatment have a substantial portion of its alkali metal content replaced by the hydrogen ion.

BACKGROUND OF THE INVENTION

This invention relates to an improved hydrocarbon conversion catalyst. More particularly, this invention relates to an improved hydrocarbon conversion catalyst comprising a crystalline alumino-silicate zeolite. Still more particularly, this invention relates to a hydrocarbon conversion catalyst comprising a crystalline alumino-silicate zeolite which has been treated with hydrogen fluoride to enhance its catalytic characteristics.

It is well known in the prior art to use crystalline alumino-silicate zeolites as hydrocarbon conversion catalysts. A large number of the crystalline alumino-silicate zeolites occur naturally and several may be synthesized by methods well known in the prior art. In general, the crystalline alumino-silicate zeolites may be represented, in their anhydrous form, by the formula:

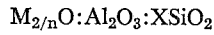

$$M_{2/n}O:Al_2O_3:XSiO_2$$

wherein M represents a metal ion and $n$ its valence and X is an integer representing the mols of $SiO_2$. The crystalline alumino-silicate zeolites are characterized by uniformly sized pore openings generally ranging between 4 and 15 angstroms. The crystalline zeolites, both naturally occurring and synthetic, may be distinguished on the basis of X-ray diffraction pattern, the silica to alumina ratio and pore size.

The crystalline alumino-silicate zeolites have proven quite satisfactory when used, either alone or in combination with other components, as catalyst for hydrocarbon conversion reactions. In general, such catalysts are highly active and exhibit excellent selectivity toward desired products when compared to the prior art amorphous silica alumina catalyst. Notwithstanding, the search for even more active catalysts which exhibit the same or even better selectivity has continued. Moreover, it is known that the crystalline structure of the alumino-silicate zeolites can be destroyed by prolonged or repeated exposure to severe conditions such as those encountered during regeneration; e.g., steam at high temperatures. This relative instability of the crystalline zeolites leads to a diminishing catalytic activity with continued use, and, ultimately, to replacement of the spent catalyst.

It is therefore an object of this invention to provide a crystalline alumino-silicate zeolite having improved catalytic properties. More specifically, it is an object of this invention to provide a crystalline alumino-silicate zeolite exhibiting an improved catalytic activity and an improved activity maintenance when used in hydrocarbon conversion reactions. These and other objects will be apparent from the disclosures set forth below.

2

In accordance with the present invention, a crystalline alumino-silicate zeolite having improved catalytic properties is prepared by treating either a naturally occurring or synthetic crystalline zeolite with hydrogen fluoride. It is essential to the present invention that a substantial portion of the metal content of the thus treated crystalline zeolite be replaced with either hydrogen or a hydrogen precursor ion. Such exchange can be accomplished by methods well known in the prior art. It will be appreciated, for reasons more fully set forth below, that the hydrogen fluoride treatment should be accomplished after the zeolite has been otherwise prepared for use in the desired hydrocarbon conversion reaction. Following the HF treatment, the treated zeolite will be dried and recovered for use in the desired hydrocarbon conversion process.

GENERAL DESCRIPTION

In general, any crystalline alumino-silicate zeolite may be treated with hydrogen fluoride by the method of this invention. It will be appreciated, however, that the extent of improvement will vary with the several zeolites. Such variance is known to occur, for example, with varying silica to alumina ratios and varying pore size. The naturally occurring zeolites which may be enhanced by the method of the present invention include but are not limited to, faujasite, mordenite and heulandite. Similarly, the synthetic forms of these and other zeolites may be enhanced by the method of this invention.

In general, the synthetic zeolites are prepared by crystallizing a suitable mixture of silica, alumina and an alkali metal oxide in an aqueous medium. Both the silica and the alumina employed in the admixture may be present as such or both may be derived from materials which yield silica and alumina at the conditions of crystallization. For example, the silica may be derived from an aqueous colloidal silica sol, sodium silicate, or silicic acid. In the same manner, alumina may be derived from an alumina gel, an alumina sol, or sodium aluminate. The alkali metal oxide may also be present as such or in the form of an alkali metal hydroxide. The crystallization is accomplished by maintaining the admixture at an elevated temperature for an extended period of time. Following crystallization, the product may be washed to remove excess reactants and undesirable impurities.

Owing to the relative inactivity of the alkali metal, it has been found necessary to exchange the alkali metal content of the crystalline zeolite with a cation more conducive to catalytic activity. Since the naturally occurring zeolites are found in an inactive form, it is also necessary to subject these materials to an ion exchange treatment.

To provide the catalytically active form of the crystalline zeolite, the catalytically inactive form may be slurried, percolated or otherwise contacted with a dilute aqueous solution of a soluble salt of any one or more desired cations. For purposes of the present invention, it is preferred that a substantial portion of the catalytically inactive ion; e.g., sodium, be replaced with hydrogen or a hydrogen precursor ion such as the ammonium ion. In a preferred embodiment, the alkali metal content will be reduced to less than 1 wt. percent, and more preferably to a content ranging between 0.1 and 0.3 wt. percent by replacement thereof with hydrogen or a hydrogen precursor ion. It will be appreciated, however, that other catalytically reactive metals, such as the Group II–B metals, the noble metals and the rare earths, may be used in combination with the hydrogen or hydrogen precursor ions. The concentration of these ions in the exchanged zeolite should be sufficiently low as to avoid substantial reaction between these cations and the hydrogen fluoride.

It is also preferred in the present invention that all treatment of the crystalline alumino-silicate zeolite requiring contact with water or steam at high temperatures be accomplished prior to the hydrogen fluoride treatment. It follows that the crystalline alumino-silicate to be treated by the method of the present invention, synthetic or naturally occurring, should be washed, ion exchanged, and steam treated, if such treatment is desired, prior to the hydrogen fluoride treatment. Further, where metals in addition to those employed in the ion exchange step are to be used, such metals may be incorporated by conventional methods prior to the hydrogen fluoride treatment. The addition of metals or metal compounds having hydrogenation activity is particularly contemplated in the present invention. Such metals may be introduced by ion exchange, wet or dry impregnation, etc. It will be appreciated that such metals may be incorporated after the hydrogen fluoride treatment, but it should be noted that any contacting of the hydrogen fluoride treated catalyst with water will result in some loss of fluorine from the treated catalyst. Accordingly, it is preferred that such metals be incorporated prior to the hydrogen fluoride treatment. Moreover, where it is desired to incorporate the crystalline alumino-silicate zeolite into a siliceous or alumina matrix, such incorporation should be accomplished prior to the hydrogen fluoride treatment.

In addition to the crystalline alumino-silicates set forth above, it has been found and thus forms another embodiment of the present invention, that alumina-deficient crystalline alumino-silicate zeolites may be activated by the method of this invention. In general, the alumina-deficient zeolites may be produced by steam treatment of a naturally occurring or synthetic zeolite at elevated temperatures for a time sufficient to remove the desired amount of alumina from the crystalline lattice. Both the time and temperature required for the removal of alumina from the crystalline structure will vary with the particular zeolite selected for treatment. In general, however, temperatures within the range of 800 and 1500° F. for periods ranging between 1 and 10 hours will be sufficient. The treatment may be accomplished at atmospheric or higher pressures. Since it is preferred in the present invention that the zeolite subjected to the hydrogen fluoride treatment be in the hydrogen or hydrogen precursor form, it is preferred that the zeolite subjected to the aforedescribed steam treatment also be in the hydrogen or hydrogen precursor form.

Following the treatment to remove alumina from the crystalline lattice, it may be desirable to remove the "trash" alumina from the crystalline product by extraction with dilute acid. Any of the mineral acids may be used for this purpose. In general, the pH of the extraction solution should range between about 1 and 4. It will be appreciated that the acid extraction is not essential to the present invention and this step can be omitted if higher concentrations of hydrogen fluoride are used in the hydrogen fluoride treatment step. As with the naturally occurring and synthetic crystalline alumino-silicate zeolite which may be activated by the method of the present invention, all treatment requiring contact at high temperatures with water or steam will preferably be accomplished prior to the hydrogen fluoride treatment. Such treatments include ion exchange, washing and the calcination in a moist atmosphere.

The crystalline alumino-silicate zeolites which may be activated by the method of this invention are contacted with hydrogen fluoride in either an aqueous or anhydrous form at a temperature between 50 and 175° F. In general, the crystalline zeolite will be treated with an amount of hydrogen fluoride which is sufficient to impart the desired degree of activity without removing silica from the crystalline lattice. With most of the crystalline zeolites which may be activated by a method of this invention, this will range between about 0.1 and 10% based on weight of zeolite. When treating naturally occurring or synthetic zeolites which have not been treated such as to alter the crystalline lattice, it is preferred to use lower concentrations of hydrogen fluoride; e.g., 0.1 to 5% based on weight of zeolite and most preferably 0.5 to 3% based on weight of zeolite. Similarly, it is preferred to use these same lower concentrations of hydrogen fluoride when treating alumina-deficient zeolites which have been treated with a dilute mineral acid to remove "trash" alumina. When treating steamed zeolites which have not been acid extracted, it is desirable to use higher concentrations of the hydrogen fluoride; e.g., 3–10% based on weight of zeolite, preferably 3–6%.

Following the hydrogen fluoride treatments, the crystalline alumino-silicate zeolite can be dried.

Without wishing to be bound by any theory, it is believed that the hydrogen fluoride treatment results in a substitution of at least a portion of the OH groups in the crystalline zeolite with fluorine thereby increasing the acidity of the crystalline zeolite. It is known that zeolites treated with hydrogen fluoride in accordance with the method of this invention do contain between 0.1 and 6 wt. percent fluorine following the treatment and subsequent drying. It is preferred in the present invention that the treated zeolite be substantially in the hydrogen or hydrogen precursor form, since in the presence of most metals commonly used in hydrocarbon conversion catalysts the hydrogen fluoride would react preferentially with the metals, thereby reducing the effect of these metals without increasing the acidity of the crystalline zeolite by replacement of the OH groups. Contacting the hydrogen fluoride treated zeolite with water will result in a reversion of the replaced OH groups, thereby reducing the increased acidity due to the presence of the fluorine groups. It will be appreciated that the presence of small quantities of water at low temperatures does not rapidly cause a displacement of the fluorine atoms, and hence, some contact with water can be tolerated.

The hydrogen fluoride treated catalyst of the present invention have been found to be most effective in hydrocarbon conversion reactions which do not require frequent regeneration of the catalyst. The principal hydrocarbon conversion reactions of this type are the hydrotreating reactions such as hydroisomerization and hydrocracking. When the zeolites of the present invention are to be used in such reaction, it is, of course, desirable to incorporate a hydrogenation component with the treated zeolite. Any of the metals known to exhibit hydrogenation activity, such as the Group II–B and Group VI–VIII metals, may be used. The noble metals such as palladium and platinum are preferred. In general, one or more of these metals will be incorporated in a concentration between 0.05 and 2 wt. percent. Concentrations between 0.1 and 1 wt. percent are preferred.

PREFERRED EMBODIMENT

In a preferred embodiment of the present invention, crystalline alumino-silicate zeolites having a silica-to-alumina ratio of at least 3 to 1, on a mole basis, will be activated by the hydrogen fluoride treatment of the present invention. Prior to the hydrogen fluoride treatment, the alkali metal content of the high silica-to-alumina crystalline alumino-silicate zeolite will be reduced by exchange with hydrogen or a hydrogen precursor ion to an amount preferably below 1 wt. percent and most preferably between 0.1 and 0.3 wt. percent. In a most preferred embodiment, the alkali metal content will have been reduced by exchange with a hydrogen precursor ion. Such exchange will be accomplished by treatment of the alkali metal zeolite with an aqueous solution containing a soluble ammonium salt such as ammonium nitrate at a temperature between 50 and 175° F., for a time sufficient to exchange the requisite amount of the alkali metal. Following the exchange of the alkali metal with the hydrogen precursor, the exchanged zeolite will be washed to remove the freed alkali metal compound. In the preferred embodiment, the ammonium form of the high silica-to-alumina crystalline alumino-silicate zeolite will then be composited with 0.1 to 1 wt. percent of a noble metal selected from the group of palladium and platinum.

In a most preferred embodiment, the hydrogen fluoride treatment of the present invention will be used to activate an alumina deficient faujasite. The alumina deficient faujasite will be derived from a hydrogen or ammonium form of the Y-type faujasite by steam treatment at a temperature of about 900 to 1300° F., most preferably 1100° F. at atmospheric pressure for a period of time between 1 and 6 hours, most preferably about 1 to 3 hours. The thus treated faujasite will then have a silica-to-alumina ratio above about 6 to 1 and most preferably above about 8 to 1. The alumina deficient faujasite will then be treated with a dilute solution of a mineral acid at a pH between about 1 and 4 and most preferably about 2 to 3 to remove the alumina that was freed during the steam treatment. The acid treated alumina deficient faujasite is then washed and composited with about 0.5% of a noble metal selected from the group consisting of palladium and platinum.

After the crystalline alumino-silicate zeolite is composited with a noble metal, said zeolite is then treated with an aqueous solution of hydrogen fluoride at a temperature between 50 and 175° F. The treatment will be continued for such time as to allow the crystalline zeolite to be contacted with from about .5 to 3% HF on a weight basis. Following the HF treatment, the thus activated crystalline alumino-silicate zeolite will be dried at a temperature between 150 and 300° F. The dried crystalline alumino-silicate zeolite is suitable for use in such hydrotreating reactions as hydroisomerization and hydrocracking.

In a preferred embodiment, the hydrogen fluoride activated zeolites will be composited with alumina and used to hydrocrack such feeds as virgin gas oils, coker gas oils and cycle stocks from catalytic cracking. The hydrocracking will be accomplished by contacting such feeds with the composite catalyst at a temperature between 400 and 700° F. in the presence of hydrogen. Similarly, the hydrogen fluoride activated zeolites of the present invention may be composited with alumina, silica, or silica-alumina and used to hydroisomerize such feeds as pentane, hexane, and light naphtha. The hydroisomerization will be accomplished by contacting such feeds with the composite catalyst at a temperature between 400 and 600° F. in the presence of hydrogen.

The preferred embodiment is further illustrated by the following example:

EXAMPLE 1

An alumina-deficient Y-type faujasite was prepared by contacting the ammonium form of a synthetic faujasite containing 2.2 wt. percent sodium with steam at a temperature of 1000° F. for a period of one hours and a pressure of one atmosphere. The alkali metal content of the alumina-deficient faujasite was then further reduced by contacting said faujasite with a soluble ammonium salt ($NH_4NO_3$) at 75° F. for two hours. The treatment with $NH_4NO_3$ was repeated three times. The faujasite was again contacted with steam, this time at a temperature of 1200° F. for one hour and the alkali metal content still further reduced by contacting the steamed faujasite again with ammonium nitrate for two hours at 75° F. Following the steam treatment, the steamed faujasite was impregnated with 0.5 wt. percent palladium and then contacted with an aqueous solution of hydrogen fluoride at a temperature of 75° F. such that the zeolite was contacted with 5 wt. percent HF. The hydrogen fluoride treated zeolite was then dried at a temperature of 250° F. and used in the hydrotreating reactions set forth in the following examples.

EXAMPLE 2

The hydrogen fluoride treated, alumina deficient faujasite obtained in Example 1 was used to hydrocrack decane. The decane was passed over the hydrogen fluoride activated catalyst at a rate of 2 v./v./hr., at several temperatures between 400–550° F. and 450 p.s.i.g. pressure. Hydrogen was introduced at the rate of 10 moles/mole feed. The conversion data, obtained at several temperatures, was then used to construct an Arrhenius plot, and the temperature necessary for 50% conversion determined therefrom. The 50% conversion temperature for the catalyst of this example was 395° F.

For purposes of comparison, a catalyst identical with that of Example 1, except that the hydrogen fluoride treatment was omitted, was employed at substantially the same conditions to hydrocrack decane. The results obtained from these runs show that a temperature of about 450° F. is necessary for 50% conversion of a decane feed. When these results are compared on the basis of relative activity, it is seen that the HF treated catalyst is greater than five times as active as the untreated catalyst.

EXAMPLE 3

A portion of the catalyst, prepared in Example 1, was used to hydroisomerize n-pentane. The isomerization was accomplished by passing hydrogen and a pentane feed over said catalyst at a space velocity of 8 v./v./hr., a temperature of 550° F. and a pressure of 450 p.s.i.g. Hydrogen was added at a rate of 3–4 moles/mole of pentane feed. 39.8% of the pentane was converted to isopentane.

EXAMPLE 4

An alumina-deficient Y-type faujasite was prepared by contacting the ammonium form of a synthetic faujasite containing 2.2 wt. percent sodium with steam at a temperature of 1000° F. for a period of one hour and a pressure of one atmosphere. The alkali metal content of the alumina-deficient faujasite was then further reduced by contacting said faujasite with a soluble ammonium salt ($NH_4NO_3$) at 75° F. for two hours. The treatment with $NH_4NO_3$ was repeated three times. The faujasite was again contacted with steam, this time at a temperature of 1200° F. for one hour and the alkali metal content still further reduced by contacting the steamed faujasite again with ammonium nitrate for two hours at 75° F. The treatment with $NH_4NO_3$ was repeated three times. Following the steam treatment, the steamed faujasite was impregnated with 0.5 wt. percent palladium and then contacted with an aqueous solution of hydrogen fluoride at a temperature of 75° F. such that the zeolite was contacted with 1.5% HF. The steamed faujasite had a sodium content of 0.20 wt. percent. The hydrogen fluoride treated zeolite was then dried at a temperature of 250° F. and used in the hydrotreating reactions set forth in the following examples.

EXAMPLE 5

The hydrogen fluoride treated, steamed faujasite obtained in Example 1 was used to hydrocrack decane. The decane was passed over the hydrogen fluoride activated catalyst at a rate of 2 v./v./hr., at several temperatures between 400–550° F. and 450 p.s.i.g. pressure. Hydrogen was introduced at the rate of 10 moles/mole feed. The conversion data, obtained at several temperatures, was then used to construct an Arrhenium plot, and the temperature necessary for 50% conversion determined therefrom. The 50% conversion temperature for the catalyst of this example was 395° F.

For purposes of comparison, a catalyst identical with that of Example 1, except that the hydrogen fluoride treatment was omitted, was employed at substantially the same conditions to hydrocrack decane. The results obtained from these runs show that a temperature of about 450° F. is necessary for 50% conversion of a decane feed. When these results are compared on the basis of relative activity, it is seen that the HF treated catalyst is greater than five times as active as the untreated catalyst.

Having thus described and illustrated the invention, what is claimed is:

1. As a composition of matter a crystalline alumino-silicate zeolite containing an ion selected from the group consisting of hydrogen and hydrogen precursor ions and between about 0.1 and about 6 wt. percent of fluorine.

2. As a composition of a matter crystalline alumino-silicate zeolite having a crystalline structure of faujasite containing an ion selected from the group consisting of hydrogen and hydrogen precursor ions and between about 0.1 and about 6 wt. percent fluorine.

3. A process for preparing a crystalline alumino-silicate zeolite containing fluorine which comprises (1) contacting a crystalline aluminosilicate zeolite with hydrogen fluoride at a temperature between 50 and 175° F. and (2) thereafter recovering a fluorine-containing crystalline alumino-silicate zeolite.

4. The process of claim 3 wherein said crystalline alumino-silicate zeolite is a faujasite.

5. The process of claim 4 wherein said faujasite is a synthetic faujasite.

6. A process for preparing a fluorine-containing crystalline alumino-silicate zeolite comprising (1) replacing a portion of the metal content of said crystalline alumino-silicate zeolite with an ion selected from the group consisting of hydrogen and hydrogen precursor ions, (2) contacting the thus treated crystalline alumino-silicate zeolite with hydrogen fluoride at a temperature between 50 and 175° F., and (3) recovering a crystalline alumino-silicate zeolite containing between about 0.1 and about 6 wt. percent fluorine.

7. The process of claim 6 wherein said crystalline alumino-silicate zeolite is a faujasite.

8. The process of claim 7 wherein said faujasite is a synthetic faujasite.

9. The process of claim 7 wherein said faujasite is an alumina deficient faujasite.

10. The process of claim 6 wherein the metal content of said crystalline alumino-silicate zeolite is reduced to a value between about 0.1 and about 0.3 wt. percent.

11. A process for preparing a hydrocarbon conversion catalyst which comprises (1) first reducing the metal content of said crystalline alumino-silicate zeolite by replacement thereof with an ion selected from the group consisting of hydrogen and hydrogen precursor ions, (2) compositing the thus exchanged crystalline alumino-silicate zeolite with a hydrogenation component, (3) contacting the composite with hydrogen fluoride at a temperature between 50 and 175° F., and (4) recovering a hydrocarbon conversion catalyst.

12. The process of claim 11 wherein the said metal is an alkaline metal.

13. The process of claim 11 wherein said hydrogen fluoride is used as an aqueous solution thereof.

14. The process of claim 11 wherein said crystalline alumino-silicate zeolite is a faujasite.

15. The process of claim 14 wherein said faujasite is a synthetic faujasite.

16. The process of claim 14 wherein said faujasite is an alumina deficient faujasite.

References Cited

UNITED STATES PATENTS

| | | | |
|---|---|---|---|
| 3,248,342 | 4/1966 | Elliott, Jr. et al. | 252—442 |
| 3,318,802 | 5/1967 | Martin | 252—455 X |
| 3,354,078 | 11/1967 | Miale et al. | 252—455 X |
| 3,403,108 | 9/1968 | Leftin et al. | 252—455 X |

DANIEL E. WYMAN, Primary Examiner

C. F. DEES, Assistant Examiner